United States Patent [19]
Simonet

[11] 3,884,661
[45] May 20, 1975

[54] METHOD OF AND INSTALLATION FOR FRACTIONATION BY ADSORPTION

[75] Inventor: Guy Simonet, Paris, France

[73] Assignee: L'Air Liquide, Societe Anonyme pour L'Etude et L'Exploitation des Procedes Georges Claude, Paris, France

[22] Filed: Sept. 11, 1972

[21] Appl. No.: 287,728

[30] Foreign Application Priority Data
Sept. 13, 1971 France .............................. 71.32900

[52] U.S. Cl. .......................................... 55/62; 55/68
[51] Int. Cl. ............................................ B01d 53/04
[58] Field of Search ............... 55/32, 33, 58, 62, 68, 55/74, 75, 179, 387

[56] References Cited
UNITED STATES PATENTS
| | | | |
|---|---|---|---|
| 3,435,591 | 4/1969 | Spencer et al. .......................... | 55/62 |
| 3,494,102 | 2/1970 | Dunn ....................................... | 55/62 |
| 3,738,084 | 6/1973 | Simonet et al. .......................... | 55/62 |

Primary Examiner—Charles N. Hart
Attorney, Agent, or Firm—Young & Thompson

[57] ABSTRACT

A method of fractionation of a gaseous mixture by adsorption is more particularly concerned with the purification of a gaseous mixture from at least one impurity especially dehydration and decarbonation by adsorption of a gaseous mixture, the method comprising an adsorption phase during which the gaseous mixture is forced to circulate from the inlet to the outlet of an adsorption zone comprising an adsorbent mass which preferentially adsorbs at least one constituent of said gaseous mixture so as to obtain a gaseous fraction impoverished in at least said constituent; a desorption phase during which at least one regeneration fraction is heated, said heated fraction being circulated in said adsorption zone, thereby obtaining at least one fraction enriched in at least said constituent, said regeneration fraction being re-cycled in said adsorption zone; a cooling phase during which at least one cooling fraction is cooled and said cooled fraction is caused to circulate in said adsorption zone, said cooling fraction being re-cycled in said adsorption zone; and in which the said regenration fraction is exclusively obtained from the residual gaseous fraction present in said adsorption zone at the end of the adsorption phase.

1 Claim, 1 Drawing Figure

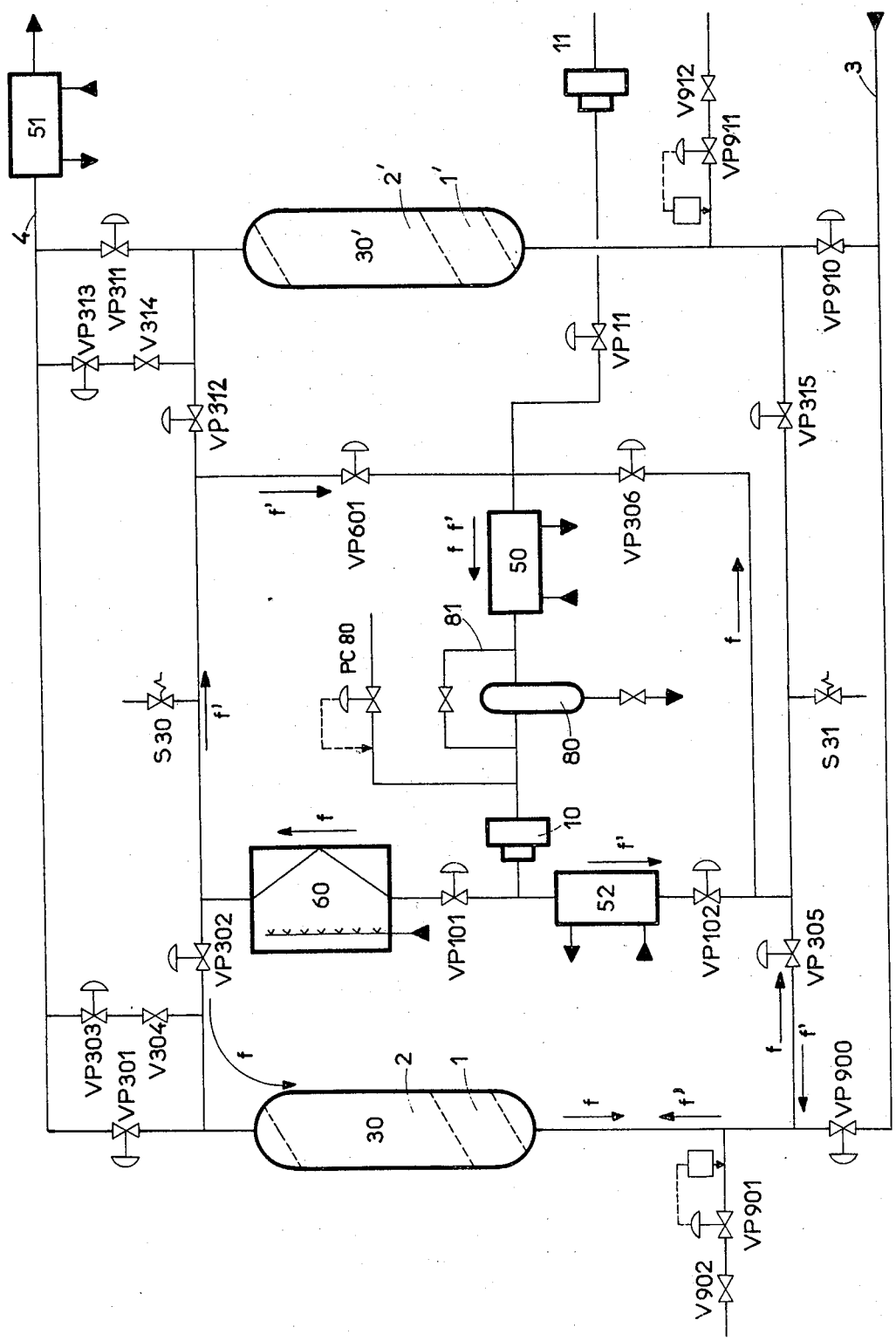

METHOD OF AND INSTALLATION FOR FRACTIONATION BY ADSORPTION

The present invention relates to a method for the fractionation of a gaseous mixture by adsorption. More particularly, the invention is concerned with the purification by adsorption of a gaseous mixture from at least one impurity, especially the dehydration and decarbonation by adsorption of a gaseous mixture.

Any method of fractionation of a gaseous mixture by adsorption comprises an adsorption phase during which the gaseous mixture to be fractionated circulates from the inlet to the outlet of an adsorption zone, comprising an adsorbent mass which preferentially adsorbs at least one constituent of the gaseous mixture, so as to obtain a gaseous fraction impoverished in at least the said constituent, and a desoprtion phase desorption which the adsorbent mass is desorbed so as to obtain a gaseous fraction enriched in at least the said constituent, and the adsorbent mass is brought back into the conditions of temperature and pressure of the adsorption phase.

The desorption phase may be effected, either by lowering the pressure in the adsorption zone or by heating the adsorbent mass, or by causing a regeneration or elution fraction impoverished in at least one preferentially adsorbed constituent to circulate in contact with the adsorbent mass, or by combining all or part of these desorption means.

When the desorption phase is effected by regenerating the adsorbent mass by elution or scavenging, a gaseous elution fraction, possibly previously heated, is caused to circulate, generally in open circuit, from the outlet to the inlet of the adsorption zone, in counter-flow to the direction of circulation of the gaseous mixture in the adsorption zone during the adsorption phase.

The choice of the gaseous elution fraction depends on the conditions of operation of the installation for fractionation by adsorption, on the quantity, the quality and the availability of the gases utilized and obtained during the adsorption process.

As the elution fraction, there may be utilized at least a part of the gaseous fraction produced during the adsorption phase, impoverished in at least one constituent of the gaseous mixture to be fractionated, preferentially adsorbed on the adsorbent mass. During the desorption phase or the regeneration by elution, the elution fraction obtained at the inlet of the adsorption zone, enriched in at least one constituent of the gaseous mixture preferentially adsorbed on the adsorbent mass, is evacuated from the fractionating installation if the said enriched fraction is not used or not worthwhile using. This is for example the case of purification by adsorption: the elution fraction polluted by at least one desorbed impurity from the gaseous mixture treated is evacuated from the adsorption installation.

The part of the gaseous fraction produced during the adsorption phase and serving for the elution regeneration of the adsorbent mass, is therefore lost if it cannot be re-circulated in the fractionating installation.

This method of regeneration has furthermore the following disadvantages:

a. Since part of the fraction produced during the adsorption phase serves for the regeneration of the adsorbent mass, and since the remaining part of the said fraction is generally recovered as a product, it is necessary during each adsorption phase to treat a larger quantity of gaseous mixture than that which is strictly necessary to obtain the desired product. It is therefore essential to over-dimension the adsorption zone and therefore to use an adsorbent mass greater than that which is strictly necessary for the production of the desired product;

b. Under certain conditions of operation, the flow-rate of elution gas necessary for the regeneration of the adsorbent mass may be such that the flow-rate of gaseous mixture necessary to produce, after adsorption, at the same time the flow-rate of elution and the flow-rate of desired product is equal to or greater than the flow-rate of gaseous mixture available;

c. When the gaseous fraction obtained during the adsorption phase corresponds to a product available in small quantities or to an expensive product, the use of this product as an elution fraction is excluded.

When it is impossible to choose as the elution or scavenging fraction a part of the gaseous fraction produced during the adsorption phase, or when this choice comprises major disadvantages, it is then possible to utilize part of the gaseous mixture to be fractionated by adsorption as the elution fraction. In this case, in order to facilitate desorption, the elution fraction is generally heated previous to its passage into the adsorption zone.

This method of regeneration may however be excluded in the following cases:

a. The gaseous mixture to be treated is an expensive product and it is not admissible to lose part of this product in order to regenerate the adsorbent mass;

b. The flow-rate of elution gas necessary for regeneration is equal to or greater than the available flow-rate of gaseous mixture to be treated, for example when the quantity of adsorbent is large as compared with the flow-rate of gas to be treated.

In the cases where neither the gaseous mixture to be fractionated nor the gaseous fraction obtained during the adsorption phase can be utilized for the regeneration by elution of the adsorbent mass, the elution can be carried out by means of a gas separate from the said gaseous mixture and the said gaseous fraction. To this end, there has been proposed a method of fractionation by adsorption of a gaseous mixture, which utilizes at least one elementary cycle comprising:

a. An adsorption phase during which the gaseous mixture is caused to circulate from the inlet to the outlet of an adsorption zone comprising an adsorbent mass which preferentially adsorbs at least one constituent of the gaseous mixture so as to obtain a gaseous fraction impoverished in at least the said constituent;

b. A desorption phase during which at least one regeneration fraction distinct from the said gaseous mixture and from the said gaseous fraction is heated, the said heated fraction at least being circulated in the adsorption zone in counter-flow to the direction of adsorption, obtaining at least one fraction enriched in at least the said constituent, the regeneration fraction being re-cycled to the outlet and into the adsorption zone;

c. A cooling phase during which at least one cooling fraction, identical to the regeneration fraction obtained at the end of the regeneration phase is cooled, and at least the said cooled fraction is caused to circulate in the adsorption zone in concurrent flow with the direction of adsorption, and the cooling fraction is re-cycled to the inlet and into the adsorption zone.

In certain cases however, regeneration by elution by means of a third gas, other than the gaseous mixture or the production fraction, is to be prohibited. In fact, a small quantity of the third gas necessarily remains adsorbed on the adsorbent mass at the end of the desorption phase, this quantity being smaller as the regeneration temperature increases or as the regeneration pressure is lower. During the adsorption phase, this small quantity is desorbed by elution during the passage of the treated gaseous mixture into the adsorption zone, and is replaced by at least one constituent of the said mixture preferentially adsorbed on the adsorbent mass. In consequence, the third gas thus more or less pollutes the gaseous fraction produced during the adsorption phase. The utilization of a third gas is therefore not permissible in cases where it is required that the gaseous fraction produced should have a very high purity.

Numerous cases exist in which the quantity, quality and utilization of the gases employed or obtained during the method of fractionation by adsorption are such that neither the gaseous fraction produced by adsorption nor the gaseous mixture treated, nor another gas, can be utilized as the regeneration fraction.

By way of example, in the purification by adsorption of a mixture comprising 88 percent of carbon monoxide by volume and 12 percent of carbon dioxide by volume so as to obtain a carbon monoxide containing between 0 and 6 volumes of impurities per million, it is not possible to desorb the adsorbent mass with:

part of the carbon monoxide produced: as carbon monoxide is an expensive product, the economy of the method requires that the whole of the production of the installation should be collected as a product;

part of the initial mixture: the quantity of carbon dioxide adsorbed by the adosrbent mass is such that regeneration by elution would necessitate a flow-rate of the treated mixture greater than the flow-rate of this mixture available;

another gas entirely separate from the initial mixture or the production fraction: the purity required for the carbon monoxide makes it essential to work without the aid of a third gas which is capable of polluting the final product.

In these cases, it no longer appears possible a priority to desorb the adsorbent mass by elution in an open circuit. In fact, if for the above-stated reasons the use as an eluent has been excluded, either of the gaseous mixture to be treated, or of the production fraction, or of another gas, the sole fraction available is therefore that produced in the desorption phase, enriched in at least one constituent which has been preferentially adsorbed during the adsorption phase. The use of this enriched fraction for the elution of an adsorbed phase generally less rich in the constituent to be desorbed than this said fraction appears to be excluded. Thus, during purification by adsorption, it appears to be excluded to effect the elution and regeneration of the adsorbent mass with a flow of the impurity.

The present invention has therefore for its object a method of fractionation by adsorption of a gaseous mixture, in which the desorption phase may be effected by causing the circulation in the adsorption zone of a regeneration fraction which is substantially independent of any gaseous supply resulting from the production of the fractionating installation or external to this installation.

According to the invention, it has been found that the fact of obtaining the desired regeneration fraction exclusively from the residual gaseous fraction present in the adsorption zone at the end of the adsorption phase, and the fact of providing during the cooling phase the cooling fraction with a small making-up portion of the gaseous fraction impoverished in at least one constituent, applied to the method of fractionation described in connection with the regeneration of the adsorbent mass by a third gas, enable a method of fractionation by adsorption to be defined, which can be totally independent of any supply of regeneration gas.

In other words, the inventive combination of the invention co-operates with the characteristics of the method of fractionation described above, in order to render this latter completely independant of any supply of regeneration fraction.

If the adsorption pressure under which the adsorption phase is carried out is higher than the regeneration pressure at which the desorption phase is effected, between the adsorption phase and the desorption phase the residual gaseous fraction of the adsorption pressure is expanded to the regeneration pressure in order to obtain the regeneration fraction. If the adsorption pressure is substantially equal to the regeneration pressure, the residual gaseous fraction existing in the adsorption zone at the end of the adsorption phase constitutes directly the regeneration fraction.

In consequence, according to the invention, for example when the adsorption and regeneration pressures are substantially equal, at the end of the adsorption phase the adsorption zone is isolated by closing the inlet and the outlet of this latter. Then, during the desorption or regeneration phase, the inlet and the outlet of the adsorption zone are put respectively into communication with the two extremities of a circuit which forms a regeneration loop with the adsorption zone. The residual gaseous fraction existing in the adsorption zone, having been isolated at the end of the adsorption phase, in adsorption equilibrium with the adsorbed phase on the substantially saturated adsorbent mass, is then caused to circulate.

This regeneration fraction, previously heated, circulates preferentially in counter-flow to the direction of adsorption, from the outlet to the inlet of the adsorption zone. It rapidly becomes enriched in desorbed constituent and may be very quickly assimilated with the desorbed constituent in a substantially pure state. The excess quantity of the said constituent is eliminated by any appropriate means (scavenging, condensation followed by separation of the condensed fraction, etc.) of the regeneration loop, in order to keep the regeneration pressure constant.

Then, during the cooling phase, the cooling fraction or regeneration fraction existing in the adsorption zone at the end of the desorption phase (assimilable to the practically pure desorbed constituent) is put into circulation in a cooling loop including the adsorption zone which may possibly coincide with the regeneration loop, preferably in the opposite direction to that preceding, that is to say in the same direction as that of the adsorption. After cooling, the regeneration fraction thus passes cyclically through the adsorption zone from its inlet to its outlet, during the cooling phase.

Following the considerations referred to above, according to the invention, it is at first sight surprising and paradoxical to be able to regenerate the adsorbent mass with a regeneration fraction richer in constituent to be desorbed than the adsorbed phase.

In fact, during the regeneration phase, as indicated above, the regeneration fraction is rapidly assimilable to the desorbed constituent in a substantially pure state. In other words, in the case of purification by adsorption, this is equivalent to saying that the adsorbent mass is regenerated by circulation of the impurity in contact with the said mass.

The invention in fact rests on the following observation. During the regeneration or desorption phase, the regeneration fraction comparable to the substantially pure desorbed constituent serves essentially as a heat transfer medium between a hot source (heating means) and the adsorbent mass. In other words, the adsorbent mass is desorbed during the regeneration phase, not by elution but essentially by heating. The invention thus opens up a new method of regeneration of an adsorbent mass.

The present invention will now be described in more detail with reference to the single FIGURE of the accompanying drawing.

The installation for fractionation by adsorption, as shown in the FIGURE annexed is utilized for purification by adsorption and more particularly for the dehydration and decarbonation of a gaseous mixture.

This installation comprises two adsorbers or adsorption zones 30 and 30', arranged in parallel. Each adsorber comprises an adsorbent mass comprising a first adsorption bed 1 or 1' which preferentially adsorbs a first constituent or first impurity (water) from the gaseous mixture treated, and a second adsorption bed 2 or 2' which preferentially adsorbs a second constituent or second impurity (carbon dioxide) from the said mixture. Each adsorber 30 or 30' is connected to an inlet conduit 3 for the gaseous mixture to be fractionated or purified and to an outlet conduit 4 for a fraction impoverished in the first and second constituents, or fraction purified from water and carbon dioxide.

A set of gate-valves VP 900 and VP 910, mounted at the inlet of the adsorbers, and of gate-valves VP 301 and and VP 311, arranged at the outlet of the adsorbers, enable the gaseous mixture to be treated to be circulated alternately and successively in the adsorbers 30 and 30'. The installation comprises a gas circulating means or circulator 10. A set of gate-valves VP 302 and VP 305, VP 312 and VP 315, VP 101 and VP 306, VP 102 and VP 601 enables the circulator 10 to be successively included in a regeneration circuit and in a cooling circuit. The valves VP 302 and VP 305 play for the adsorber 30 the same part as the valves VP 312 and VP 315 respectively for the adsorber 30'.

For the adsorber 30, the regeneration circuit is established by opening the valves VP 302 and VP 305, VP 101 and VP 306, and closing the valves VP 312 and VP 315, VP 601 and VP 102. In the regeneration circuit, the upstream and downstream sides of the circulator 10 communicate respectively with the inlet of the adsorber 30 through the intermediary of the valves VP 306 and VP 305, and with the outlet of the adsorber 30 through the intermediary of the valves VP 101 and VP 302.

A heating means 60 is then arranged in the regeneration circuit on the upstream side of the outlet of the adsorber 30, between the valves VP 101 and VP 302. A first extraction means for a first fraction enriched in the first constituent or impurity (water) comprising a condenser 50 and a separator 80 provided with a condensate extraction valve, a second extraction means for a second fraction enriched in the second constituent or impurity (carbon dioxide) or pressure-regulation valve VP 901, are arranged in the regeneration circuit on the downstream side of the inlet of the adsorber 30. The separator 80 may be by-passed from the regeneration circuit by the by-pass conduit 81.

For the adsorber 30, the cooling circuit is obtained by opening the valves VP 302 and VP 305, VP 601 and VP 102, and closure of the valves VP 312 and VP 315, VP 101 and VP 306. In this cooling circuit, the upstream and downstream sides of the circulator 10 communicate respectively with the outlet of the adsorber 30, through the intermediary of the valves VP 102 and VP 305 and with the inlet of the adsorber 30 through the intermediary of the valves VP 302 and VP 601.

A cooling means 52 utilizing water circulation is then arranged on the cooling circuit on the upstream side of the inlet of the adsorber 30, between the circulator 10 and the valve 102. According to the accompanying FIGURE, the regeneration circuit and the cooling circuit, previously described, comprises at least one common portion incorporating the first extraction means 50, 80.

The establishment of the regeneration and cooling circuits of the adsorber 30' is carried out in identically the same way as that previously described, the valves VP 312 and VP 315 playing respectively the parts of the valves VP 302 and VP 305.

The valves VP 901 and VP 911 and cocks respectively V 902 and V 912 enable the pressure of the regeneration circuit to be maintained constant during the heating. A compressor 11 and a valve VP 11 make it possible to carry out, if necessary, a scavenging of the adsorber 30 or 30' by means of the purified gas. Sets of valves and cocks, VP 303 and V 304 on the one hand and VP 313 and V 314 on the other, make it possible to introduce a portion of the fraction impoverished in adsorbed constituents, or purified fraction, at the outlet respectively of the adsorbers 30 and 30', in order to carry out the operation known by the name of "front-raising" and restoration of pressure in each adsorber.

There will now be described an elementary cycle of fractionation by adsorption of the gaseous mixture to be treated. This elementary cycle, for the adsorber 30 for example, comprises:

An adsorption phase during which the gaseous mixture to be fractionated or purified, coming in through the conduit 3, is caused to circulate under an adsorption pressure from the inlet to the outlet of the adsorber 30. To this end, the valves VP 900 and VP 301 are opened and the valves VP 302, VP 303 and VP 305 are closed. The gaseous mixture thus circulates at ambient temperature in contact with the dehydration bed 1 and the decarbonation bed 2, and there is obtained at the outlet of the adsorber 30 a gaseous fraction impoverished in the constituents preferentially adsorbed on the adsorbent mass, that is to say a fraction purified from water and carbon dioxide.

A decompression phase during which there is exclusively obtained the regeneration fraction from the residual gaseous fraction existing in the adsorption zone at the end of the adsorption phase. To this end, the valves VP 301 and VP 900 are closed and the adsorption zone is thus isolated. The residual gaseous fraction contained in the adsorption zone, in adsorption equilibrium with the phase adsorbed on the substantially saturated adsorbent mass is expanded from the adsorption pressure to the regenerating pressure (for example atmospheric pressure) by opening the valve 902 for instance. There is thus obtained the regeneration fraction at the regeneration pressure.

A desorption or regeneration phase, during which the regeneration fraction previously obtained is caused to circulate in the regeneration circuit defined above, in the direction of the arrows $f$ of the accompanying FIGURE. During this phase, the valves VP 301 and VP 900 are closed and the valves VP 302 and VP 305 are open in order to include the adsorber 30 in the regeneration circuit. The regeneration fraction in the heating means 60 is then cyclically heated to a temperature comprised between 150° and 400°C., for example of the order of 250°C., the heated fraction is circulated in the adsorption zone 30, in counter-flow with the direction of adsorption, from the outlet to the inlet of the adsorber 30, a first fraction enriched in a first adsorbed constituent (water) is extracted by means of the condenser 50 and the separator 80 permitting the extraction of the condensed water, a second fraction enriched in a second adsorbed constituent (carbon dioxide) is evacuated by the pressure-regulation valve VP 901 and the regeneration fraction is re-cycled by means of the circulator 10 to the outlet of the adsorber 30.

A cooling phase during which the regeneration fraction present in the adsorption zone 30 at the end of the desorption phase is circulated in the cooling circuit defined above, in the direction of the arrows $f'$ of the accompanying drawing. The cooling pressure at which the cooling phase is operated, is substantially equal to the regeneration pressure (atmospheric pressure, for example) under which the desorption has been carried out. During this phase, the valves VP 301 and VP 900 are still closed and the valves VP 302 and VP 305 are still open, in order to include the adsorber 30 in the cooling circuit. The regeneration fraction in the cooler 52 is cyclically cooled, the said cooled fraction is circulated in the adsorption zone in co-current flow with to the direction of adsorption, from the inlet to the outlet of the adsorber 30, the regeneration fraction is again cooled in the condenser 50 playing now the part of a cooler, the regeneration fraction passes through the conduit 81, is provided through valve PC 80 with a small making-up portion of gas purified from water and carbon dioxide, and is re-cycled by means of the circulator 10 to the inlet of the adsorber 30.

A pressure-increasing phase, during which there is effected the operation known as "front-raising." To this end, the adsorber 13 is isolated from the heating circuit by closing the valves VP 302 and VP 305 and the valves VP 305 and VP 304 are opened so as to put the adsorber into communication with a source of the gaseous fraction produced during the adsorption phase. This source may be a storage for the said fraction or the outlet of the adsorber 30' when this latter is in course of adsorption. The purified gaseous fraction is then introduced through the outlet of the adsorber 30, in counter-flow to the direction of adsorption. The pressure in the adsorber 30 then rises to the adsorption pressure.

It is at first sight surprising to be able to regenerate the adsorbent mass of the adsorber 30 by means of a regeneration fraction which is saturated with water vapour and is constituted essentially by carbon dioxide.

In fact, during the desorption or regeneration phase, the regeneration fraction becomes very rapidly charged with carbon dioxide and water, and may be very rapidly compared with carbon dioxide saturated with water.

The invention actually originates in the following dicoveries.

At the end of the regeneration phase, as the regeneration fraction is saturated with water vapour, a very small quantity of water remains effectively adsorbed on the decarbonation bed. This quantity becomes smaller as the regeneration temperature increases and as the regeneration pressure becomes lower. At the beginning of the cooling phase, the humidity of the regeneration fraction (carbon dioxide) obtained at the end of the regeneration phase is adsorbed on the first layers of the desiccation bed. The regeneration fraction is then very quickly constituted by dry carbon dioxide, while the decarbonation bed is still at high temperature. This results in a practically complete elimination of the small quantity of water retained on the decarbonation bed and this water is taken back to the inlet of the adsorber and is adsorbed on the first layers of the dehydration bed which is already cold.

Just as there is readsorbed during cooling at the inlet of the desiccation bed the residual water remaining adsorbed on the adsorbent at the end of regeneration, so there is also thereafter readsorbed in the same manner during said cooling the residual carbon dioxide remaining adsorbed on the adsorbent at the end of regeneration. During the cooling phase, the carbon dioxide contained by the regeneration fraction obtained at the end of the regeneration phase is adsorbed on the first layers of the decarbonation bed. Then the regeneration fraction becomes rapidly consituted by the making-up portion of purified gas reunited to said regeneration fraction during cooling, i.e., constituted by purified gas. This making-up gas desorbs the carbon dioxide retained in the yet warm layers of the decarbonation bed, brings back this desorbed carbon dioxide in the first layers of the decarbonation bed already cold, where this residual quantity is adsorbed. There is thus obtained a substantially complete regeneration of the adsorbent.

During the regeneration phase of course, the connections to air VP 901 and VP 911 make it possible to maintain the pressure of the regeneration circuit constant. Similarly, during the cooling phase, a supplement of purified gas can be introduced through the making-up means or valve PC 80 in order to keep the pressure constant in the cooling circuit.

In certain cases, an elementary cycle may comprise a scavenging phase carried out after the desorption phase and before the cooling phase. To this end, the valve VP 306 is closed, the valves V 902 and VP 11 are opened and the compressor 11 is startedup. For a short time, a scavenging fraction constituted by a part of the gaseous fraction produced during the course of the adsorption phase or a gaseous fraction purified from water and carbon dioxide is then circulated in counterflow to the direction of adsorption, from the outlet to the inlet of the adsorption zone 30.

This scavenging fraction blows out the regeneration fraction remaining in the adsorption zone at the end of the desorption phase. It also desorbs the quantity of impurities which necessarily remain adsorbed (expecially carbon dioxide) on the adsorbent mass under the conditions of temperature and pressure of the regeneration phase. The scavenging fraction polluted with impurities is evacuated to atmosphere through a valve V 902.

This scavenging phase thus enables the desorption of the adsorbent mass to be improved, and therefore improves the regeneration of this mass. For a product of given purity, this scavenging phase thus permits in certain cases a smaller quantity of adsorbent to be employed than when the said phase does not exist.

When this scavenging phase is employed, the cooling fraction is then constituted by the residual scavenging fraction remaining in the adsorption zone at the end of the said phase.

It should be noted that this scavenging phase may be carried out by putting the adsorption zone under vacuum, followed by an introduction of purified gas in order to bring this zone up to the regeneration pressure.

By way of example, it is possible according to the invention to purify a mixture comprising by volume 88 percent of carbon monoxide and 12 percent of carbon dioxide, by adsorption on a molecular sieve 13X and to produce carbon monoxide having between 0 and 6.4 volumes per million of impurities, this being achieved without any consumption of regeneration gas.

I claim:

1. A method of fractionation of a gaseous mixture, employing at least an adsorption zone comprising an adsorbent mass which preferentially adsorbs at least a constituent of said gaseous mixture, comprising at least an elementary adsorption cycle carried out with at least said adsorption zone, said adsorption cycle comprising successively:

a. in an adsorption phase, introducing said gaseous mixture, under an adsorption pressure, into said adsorption zone in an adsorption direction, and withdrawing a gaseous fraction impoverished in at least said constituent from said adsorption zone in said adsorption direction, b. in a regeneration phase, circulating a gaseous regeneration fraction, originating exclusively from a gaseous residual fraction contained in said adsorption zone at the end of the preceding phase, in a closed regeneration circuit under a regeneration pressure lower than said adsorption pressure, cyclically and successively heating said regeneration fraction, passing said fraction in said adsorption zone countercurrently to the adsorption direction, recycling said fraction to said adsorption zone, and withdrawing at least the desorbed said constituent in excess from said closed regeneration circuit, c. in a cooling phase, circulating a gaseous cooling fraction, originating exclusively from another gaseous residual fraction contained in said adsorption zone at the end of the preceding phase, in a closed cooling circuit under a cooling pressure substantially equal to said regeneration pressure, cyclically and successively cooling said cooling fraction, passing said cooling fraction in said adsorption zone concurrently to the adsorption direction, recycling said cooling fraction to the adsorption zone, and introducing a gaseous fraction impoverished in at least said constituent into said regeneration circuit for balancing the cooling fraction in default.

* * * * *